United States Patent
Chen et al.

(10) Patent No.: US 11,271,471 B2
(45) Date of Patent: Mar. 8, 2022

(54) POWER CONVERTER CONTROLLER HAVING A SHORT-CIRCUIT PROTECTION THRESHOLD VOLTAGE NO HIGHER THAN AN OVER-CURRENT PROTECTION THRESHOLD VOLTAGE

(71) Applicant: INNO-TECH CO., LTD., Taipei (TW)

(72) Inventors: Chin-Chuan Chen, Taipei (TW); Shu-Chia Lin, Taipei (TW); Chih-Liang Wang, Taipei (TW); Kuo-Jung Wu, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 26 days.

(21) Appl. No.: 16/993,337

(22) Filed: Aug. 14, 2020

(65) Prior Publication Data

US 2021/0328501 A1    Oct. 21, 2021

(30) Foreign Application Priority Data

Apr. 17, 2020   (TW) ................... 109113105

(51) Int. Cl.
| | |
|---|---|
| *H02M 1/32* | (2007.01) |
| *H02M 1/08* | (2006.01) |
| *H02M 3/335* | (2006.01) |
| *H02M 1/00* | (2006.01) |

(52) U.S. Cl.
CPC .............. *H02M 1/32* (2013.01); *H02M 1/08* (2013.01); *H02M 3/335* (2013.01); *H02M 1/0009* (2021.05)

(58) Field of Classification Search
CPC .......... H02M 1/32; H02M 1/08; H02M 3/335; H02M 1/0009
See application file for complete search history.

(56) References Cited

U.S. PATENT DOCUMENTS

| | | | |
|---|---|---|---|
| 2010/0007409 A1* | 1/2010 | Wang ................... | H02M 3/156 327/551 |
| 2012/0281438 A1* | 11/2012 | Fang ................. | H02M 3/33507 363/21.12 |
| 2013/0114307 A1* | 5/2013 | Fang ................. | H02M 3/33507 363/21.01 |
| 2014/0160804 A1* | 6/2014 | Sato ................... | H02M 3/33507 363/21.01 |
| 2016/0181929 A1* | 6/2016 | Chen ................ | H02M 3/33515 363/21.18 |
| 2016/0226239 A1* | 8/2016 | Yang ...................... | H02M 1/44 |
| 2018/0013352 A1* | 1/2018 | Cao ......................... | H02M 1/08 |
| 2021/0328502 A1* | 10/2021 | Chen ................ | H02M 3/33507 |

\* cited by examiner

*Primary Examiner* — Kyle J Moody

(74) *Attorney, Agent, or Firm* — Lin & Associates Intellectual Property, Inc.

(57) ABSTRACT

The present invention discloses a power converter controller having a short-circuit protection threshold voltage no higher than an over-current protection threshold voltage so that any abnormal voltage or current stress on semiconductor components can be timely sensed via a current sense pin in the event of a short-circuit fault, effectively preventing semiconductor components from being damaged.

9 Claims, 6 Drawing Sheets

POWER CONVERTER CONTROLLER HAVING A SHORT-CIRCUIT PROTECTION THRESHOLD VOLTAGE NO HIGHER THAN AN OVER-CURRENT PROTECTION THRESHOLD VOLTAGE

CROSS-REFERENCE TO RELATED APPLICATION

This application claims the priority of Taiwanese patent application No. 109113105, filed on Apr. 17, 2020, which is incorporated herewith by reference.

BACKGROUND OF THE INVENTION

1. Field of the Invention

The present invention generally relates to a power converter controller, and more specifically to a power converter controller having a short-circuit protection threshold voltage no higher than an over-current protection threshold voltage to detect short-circuit abnormality in advance, effectively decrease voltage or current stress upon semiconductor components, dynamically adjust the short-circuit protection leading edge blanking time and the over-current protection leading edge blanking time, avoid malfunction, prevent the system from damage, and assure safety for the whole operation.

2. The Prior Arts

As well known, the pulse width modulation (PWM) scheme is one of the most widely used for the switching power supply in the prior arts, and a specific integrated circuit (IC) to implement PWM feature is usually called PWM IC. In general, the PWM IC does not only control the output voltage and current of the power supply, but is also provided with appropriate protection mechanism to avoid serious risk like fire and electric shock due to incorrect use or abnormality, which even leads to damage the overall system. The traditional protection mechanism of the PWM IC at least includes protection of over-current, short-circuit, over-voltage, over-temperature, and so on.

The PWM IC in the prior arts usually employs a feedback (FB) pin and a current sensing (CS) pin. The FB pin is considered as a compensation pin or an input terminal for detecting the secondary side loading level, and the CS pin is considered as an input terminal for sensing and detecting the primary side peak current to implement PWM control of peak current mode.

Further, the PWM IC has to detect over-current and short-circuit current, and in addition to the PWM comparator, the PWM IC is usually built with two comparators, which are called over-loading threshold (Limit1) comparator and short-circuit threshold (Limit2) comparator, respectively.

The Limit1 comparator is intended for maximum current detection. When output over-loading occurs, the peak current of the CS pin increases to exceed the over-current protection threshold voltage. At this time, the Limit1 comparator is triggered, and the PWM IC waits a period of delay time and then stops output to achieve over-current protection.

When the output short-circuit or much heavier loading occurs, the peak current of the CS pin increases to exceed the short-circuit protection threshold voltage. At this time, the Limit2 comparator is triggered, and the PWM IC immediately stops output to assure that the power supply is not damaged.

One of the most commonly recognized and used schemes is that the short-circuit protection threshold voltage is set to be higher than the over-current protection threshold voltage. It is because the primary side current is considerable high while short circuit occurs, and the current sensing voltage of the CS pin is high enough to trigger the Limit2 comparator, thereby immediately stopping the output power. Furthermore, another reason for the short-circuit protection threshold voltage higher than the over-current protection threshold voltage is to avoid malfunction due to an extremely short period of over-current, causing the power supply to incorrectly stop the output power. In other words, the overall period of time when the current sensing voltage of the CS pin is greater than the short-circuit protection threshold voltage but less than the over-current protection threshold voltage is possibly very short and does not exceed the preset delay time (like during the moment of powering on), and the output power should not stop because this situation is tolerable for the design of the power supply, otherwise the system provided with the power supply certainly fails without power.

In general, the over-current protection threshold voltage is intended for over-current protection (OCP) as the threshold for the maximum input current peak, and usually called Max Current Limit, CS voltage damper, Current Limit Threshold Voltage, Limit Voltage, or Max CS threshold voltage. Further, the short-circuit protection threshold voltage is intended for short-circuit (SHORT) protection like output abnormality including short circuit of output terminal, transformer winding, or secondary rectification elements. Thus, the short-circuit protection threshold voltage is triggered for prompt protection. The short-circuit protection threshold voltage is usually called Short Protection Threshold Voltage, Diode short protection voltage, Secondary Diode Short Protection, Abnormal Overcurrent Fault Threshold, or Overcurrent Threshold.

For example, the controller chip currently used includes OB/OB2283IC, Richtek/RT7738IC, Leadtrend/LD5538I, ONSEMI/NCP1342, and TI/UCC28742, which are provided with the over-current protection threshold voltage and the short-circuit protection threshold voltage as 0.69V/1.4V, 0.40V/1.1V, 0.85V/1.5V, 0.80V/1.2V, and 0.77V/1.5V. It is obvious that the current schemes set the short-circuit protection threshold voltage to be higher than the over-current protection threshold voltage.

The drawback in the prior arts is that the short-circuit abnormality is determined to stop the output power only if the current sensing voltage from the CS pin increases to exceed the over-current protection threshold voltage and lasts for a period of time, and it thus fails to detect the short-circuit abnormality in advance. Specifically, all the components of the power supply suffer from voltage or current stress imposed by the primary current during the period of time, resulting in potential risk to cause the power supply to damage.

Therefore, it is greatly needed to provide a new power converter controller having a short-circuit protection threshold voltage no higher than an over-current protection threshold voltage to detect short-circuit abnormality in advance, effectively decrease voltage or current stress upon semiconductor components, dynamically adjust the short-circuit protection leading edge blanking time and the over-current protection leading edge blanking time, avoid malfunction, prevent the system from damage, and assure safety for the whole operation, thereby overcoming the above problems in the prior arts.

SUMMARY OF THE INVENTION

The primary object of the present invention is to provide a power converter controller having a short-circuit protection threshold voltage no higher than an over-current protection threshold voltage. The power converter controller of the present invention comprises an input power pin, a ground pin, a pulse width modulation (PWM) driving pin, a current sensing pin, and a feedback pin, and has an short-circuit protection leading edge blanking (LEB) time, an over-current protection leading edge blanking time, an over-current protection threshold voltage, and a short-circuit protection threshold voltage preset. The power converter controller is further in collocation with a rectification unit, a transformer, a switch unit, and a power output unit to perform a power control operation for converting an external input power into an output power to supply a load. In particular, the short-circuit protection threshold voltage is not higher than the over-current protection threshold voltage, and the short-circuit protection leading edge blanking time is less than the over-current protection leading edge blanking time.

Specifically, the input power pin is connected to an input power, the ground pin is connected to a ground level, the PWM driving pin is connected to a gate of the switch unit, the current sensing pin is connected to a source of the switch unit, and the source is further connected to the ground level through a current sensing resistor. The current sensing resistor generates a current sensing voltage. In addition, the feedback pin is connected to a feedback unit, and the feedback unit is further connected to the power output unit for generating a feedback voltage corresponding to the output power.

Additionally, the rectification unit receives and converts the external input power into a rectification power. The transformer comprises a primary winding and a secondary winding, the primary winding connects the rectification unit to a drain of the switch unit and receives the rectification power, the secondary winding is connected to the power output unit, and the power output unit is further connected to the load, More specifically, the power control operation comprises: the power converter controller receiving the feedback voltage and the current sensing voltage; generating a PWM driving signal based on the feedback voltage and the current sensing voltage, the PWM driving signal having a turn-on level and a turn-off level interleaving and repeating periodically; performing a timer operation to generate a determination time for determining whether the current sensing voltage is greater than the short-circuit protection threshold voltage when the PWM driving signal is the turn-on level and the switch unit is turned on; comparing the determination time with the short-circuit protection leading edge blanking time and the over-current protection leading edge blanking time if the current sensing voltage is equal to or greater than the short-circuit protection threshold voltage and is not greater than the over-current protection threshold voltage; stopping generating the PWM driving signal if the determination time is not less than the short-circuit protection leading edge blanking time and not greater than the over-current protection leading edge blanking time; and stopping generating the PWM driving signal if the determination time is equal to or greater than the over-current protection leading edge blanking time and an over-current delay time preset passes.

Another object of the present invention is to provide a power converter controller having a short-circuit protection threshold voltage no higher than an over-current protection threshold voltage. The power converter controller of the present invention has an short-circuit protection leading edge blanking time, an over-current protection leading edge blanking time, an over-current protection threshold voltage, and a short-circuit protection threshold voltage preset, and comprises an input power pin, a ground pin, a pulse width modulation (PWM) driving pin, a current sensing pin, and a feedback pin. Further, the power converter controller is in collocation with a rectification unit, a transformer, a switch unit, and a power output unit to perform a power control operation for converting an external input power into an output power.

Additionally, the input power pin is connected to an input power, the ground pin is connected to a ground level, the PWM driving pin is connected to a gate of the switch unit, the current sensing pin is connected to a source of the switch unit, and the source is further connected to the ground level through a current sensing resistor. The current sensing resistor generates a current sensing voltage.

More specifically, the above power control operation comprises: the power converter controller receiving the current sensing voltage; generating a PWM driving signal based on the current sensing voltage, the PWM driving signal having a turn-on level and a turn-off level interleaving and repeating periodically; performing a timer operation to generate a determination time for determining whether the current sensing voltage is greater than the short-circuit protection threshold voltage when the PWM driving signal is the turn-on level and the switch unit is turned on; comparing the determination time with the short-circuit protection leading edge blanking time and the over-current protection leading edge blanking time if the current sensing voltage is equal to or greater than the short-circuit protection threshold voltage and is not greater than the over-current protection threshold voltage; stopping generating the PWM driving signal if the determination time is not less than the short-circuit protection leading edge blanking time and not greater than the over-current protection leading edge blanking time; and stopping generating the PWM driving signal if the determination time is equal to or greater than the over-current protection leading edge blanking time and an over-current delay time preset passes.

Therefore, the present invention employs the short-circuit protection threshold voltage no higher than the over-current protection threshold voltage to detect short-circuit abnormal in advance, effectively decrease voltage or current stress upon semiconductor components, dynamically adjust the short-circuit protection leading edge blanking time and the over-current protection leading edge blanking time, avoid malfunction, prevent the system from damage, and assure safety for the whole operation.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
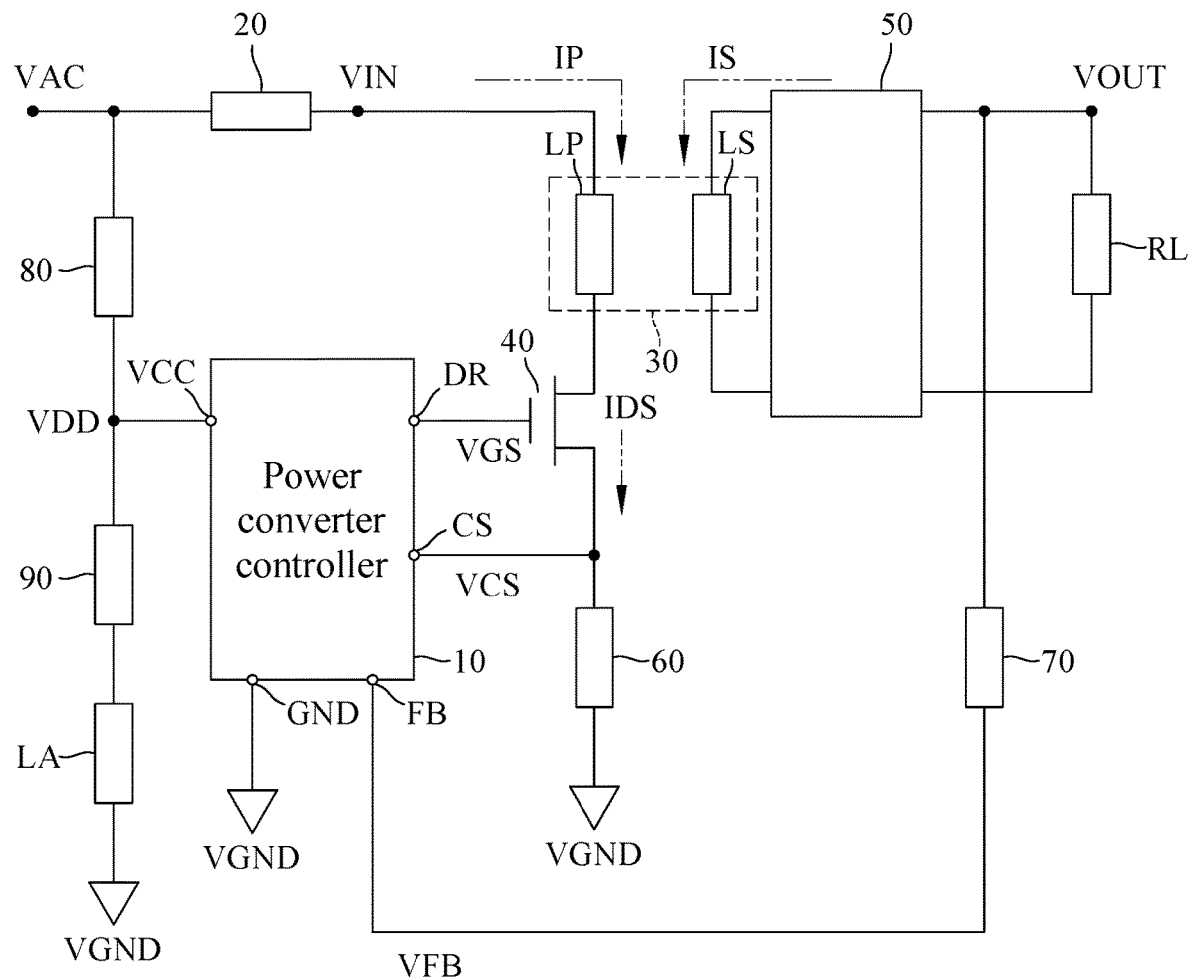
FIG. 1 is a view showing the power converter controller according to the first embodiment of the present invention.
Figure 2:
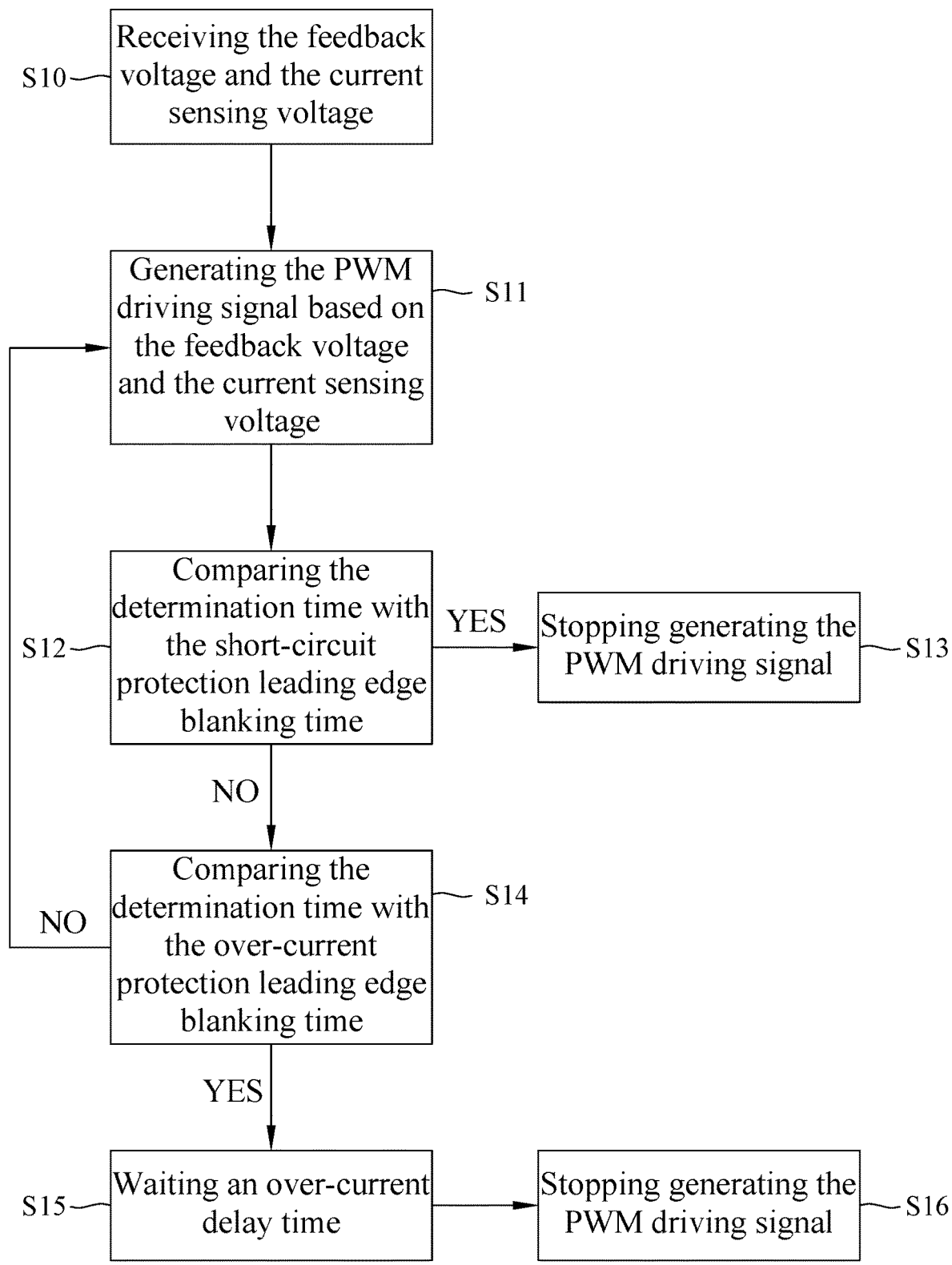
FIG. 2 is a flowchart of the power control operation performed by the power converter controller according to the first embodiment of the present invention.

Please refer to FIG. 1 showing the power converter controller according to the first embodiment of the present invention. As shown in FIG. 1, the power converter controller 10 according to the first embodiment is substantially a pulse width modulation (PWM) controller and implemented by the semiconductor process for manufacturing integrated circuit (ICs). Specifically, the power converter controller 10 comprises an input power pin VCC, a ground pin GND, a pulse width modulation (PWM) driving pin DR, a current sensing pin CS, and a feedback pin FB, and has an short-circuit protection leading edge blanking (LEB) time LEB_SS, an over-current protection leading edge blanking time LEB_OV, an over-current protection threshold voltage VOV, and a short-circuit protection threshold voltage VSS preset. In particular, the power converter controller 10 is in collocation with a rectification unit 20, a transformer 30, a switch unit 40, and a power output unit 50 to perform a power control operation for converting an external input power VAC into an output power VOUT to supply a load RL.

More specifically, the input power pin VCC is connected to an input power VDD, the ground pin GND is connected to a ground level VGND, the PWM driving pin DR is connected to a gate of the switch unit 40, the current sensing pin CS is connected to a source of the switch unit 40, and the source is further connected to the ground level VGND through a current sensing resistor 60. The current sensing resistor 60 generates a current sensing voltage VCS. In addition, the feedback pin FB is connected to a feedback unit 70, and the feedback unit 70 is further connected to the power output unit 50 for generating a feedback voltage VFB corresponding to the output power VOUT.

For example, the feedback unit 70 comprises a phot coupler.

Particularly, the above the short-circuit protection threshold voltage VSS is no higher than the over-current protection threshold voltage VOV, and the short-circuit protection leading edge blanking time LEB_SS is less than the over-current protection leading edge blanking time LEB_OV.

Further, the rectification unit 20 receives and converts the external input power VAC into a rectification power VIN through a process of rectification, filter, and regulation.

The transformer 30 comprises a primary winding LP and a secondary winding LS, the primary winding LP connects the rectification unit 20 to a drain of the switch unit 40 and receives the rectification power VIN, the secondary winding LS is connected to the power output unit 50, and the power output unit 50 is further connected to the load RL.

One of the key aspects of the present invention is that the power control operation performed by the power converter controller 10 comprises the steps S10, S11, S12, S13, S14, S15, and S16, which are performed sequentially and will be described in detail hereinafter.

First, the power control operation begins at the step S10, and the power converter controller 10 receives the feedback voltage VFB and the current sensing voltage VCS through the feedback pin FB and the current sensing pin CS, respectively. Then, the power converter controller 10 generates a PWM driving signal VGS based on the feedback voltage VFB and the current sensing voltage VCS in the step S11, and the PWM driving signal VGS has a turn-on level and a turn-off level, which interleave and repeat periodically. For instance, the turn-on level is a high level and the turn-off level is a low level lower than the high level, or alternatively, the turn-on level is a low level and the turn-off level is a high level higher than the high level.

Moreover, the switch unit 40 is implemented by a Metal-Oxide-Semiconductor (MOS) transistor, a Gallium Nitride field effect transistor (GaN FET), or a silicon carbide (SiC)-MOSFET.

In the step S12, a timer operation is performed to generate a determination time for determining whether the current sensing voltage VCS is greater than the short-circuit protection threshold voltage VSS when the PWM driving signal VGS is the turn-on level and the switch unit 40 is turned on. In other words, the PWM driving signal VGS is the turn-on level and the switch unit 40 is turned on during the determination time.

In the step S13, the determination time is compared with the short-circuit protection leading edge blanking time LEB_SS and the over-current protection leading edge blanking time LEB_OV if the current sensing voltage VCS is equal to or greater than the short-circuit protection threshold voltage VSS and is not greater than the over-current protection threshold voltage VOV. Further, if the determination time is not less than the short-circuit protection leading edge blanking time LEB_SS and not greater than the over-current protection leading edge blanking time LEB_OV, the power converter controller 10 immediately, stops generating the PWM driving signal VGS.

In other words, only when the determination time is equal to or greater than the short-circuit protection leading edge blanking time LEB_SS, the current sensing voltage VCS which is equal to or greater than the short-circuit protection threshold voltage VSS indicates a short-circuit abnormality, and the PWM driving signal VGS must immediately stops to protect the electrical elements of the system provided with the power converter controller 10. More specifically, any current sensing voltage VCS which is equal to or greater than the short-circuit protection threshold voltage VSS but does not last over the short-circuit protection leading edge blanking time LEB_SS is still considered as an instantaneous peak noise.

In the step S14, if the current sensing voltage VCS is greater than the over-current protection threshold voltage VOV, the power converter controller 10 further determines whether the determination time is greater than the over-current protection leading edge blanking time LEB_OV, and the step S15 is performed to wait an over-current delay time preset if the determination time is greater than the over-current protection leading edge blanking time LEB_OV. After the step S15, that is, the over-current delay time preset passes, the step S16 is performed to stop generating the PWM driving signal VGS. In other words, if the current sensing voltage VCS reaches or exceeds the over-current protection threshold voltage VOV within the over-current protection leading edge blanking time LEB_OV but does not last over the over-current protection leading edge blanking time LEB_OV in the step S15, the power control operation returns back to the step S11 to normally continue generating the PWM driving signal VGS.

It should be noted that when the PWM driving signal VGS stops in the step S13 or S16, the switch unit 40 is turned off and does not conduct the current. In other words, the primary current IP flowing through the primary winding LP is cut off and decreases to zero. The secondary current IS flowing through the secondary winding LS through electromagnetic interaction with the primary current IP thus stops. As a result, the power output unit 50 fails to generate the output power VOUT, and the output power VOUT decreases to zero to protect and prevent the overall system from damage.

Figure 3:
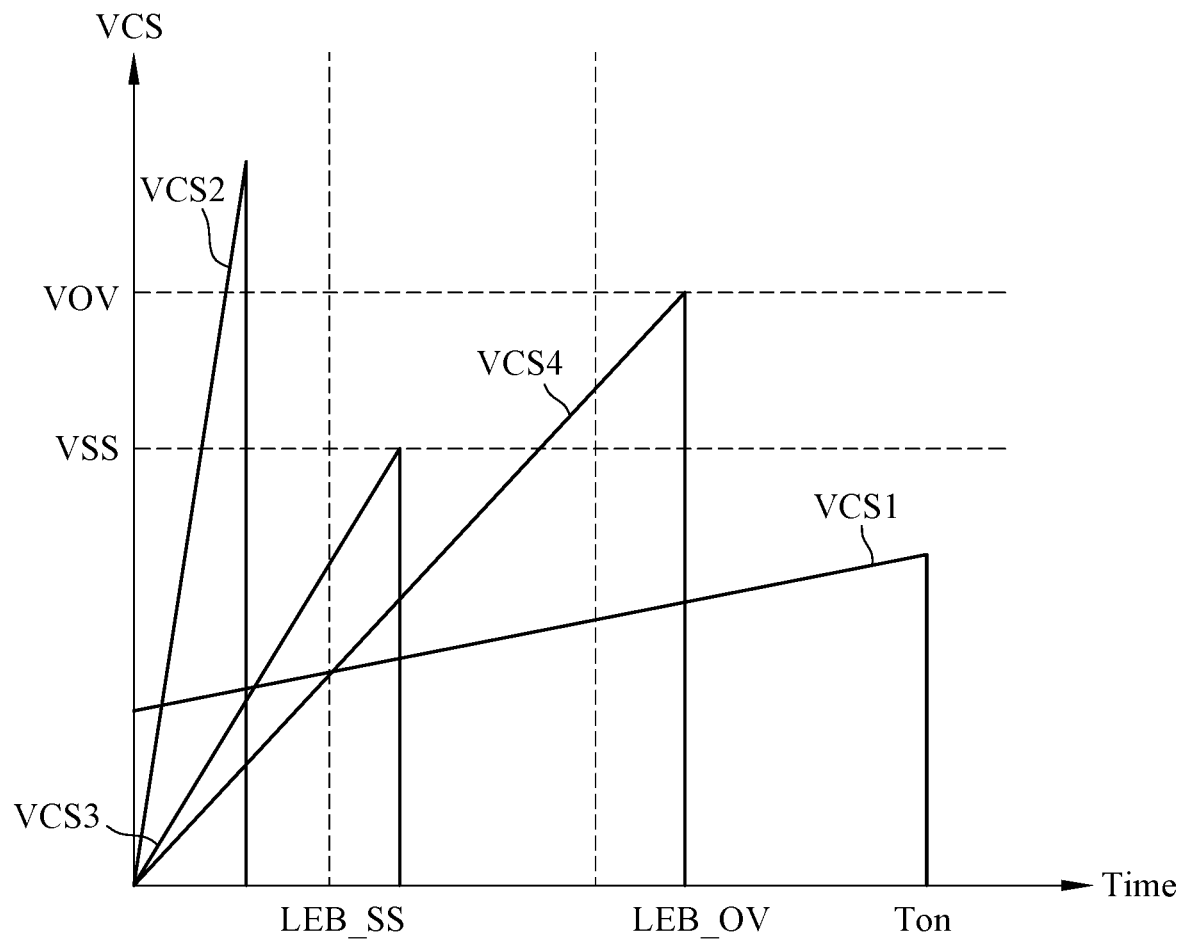
FIG. 3 is a view showing one illustrative waveform of the power converter controller according to the first embodiment of the present invention.
Figure 4:
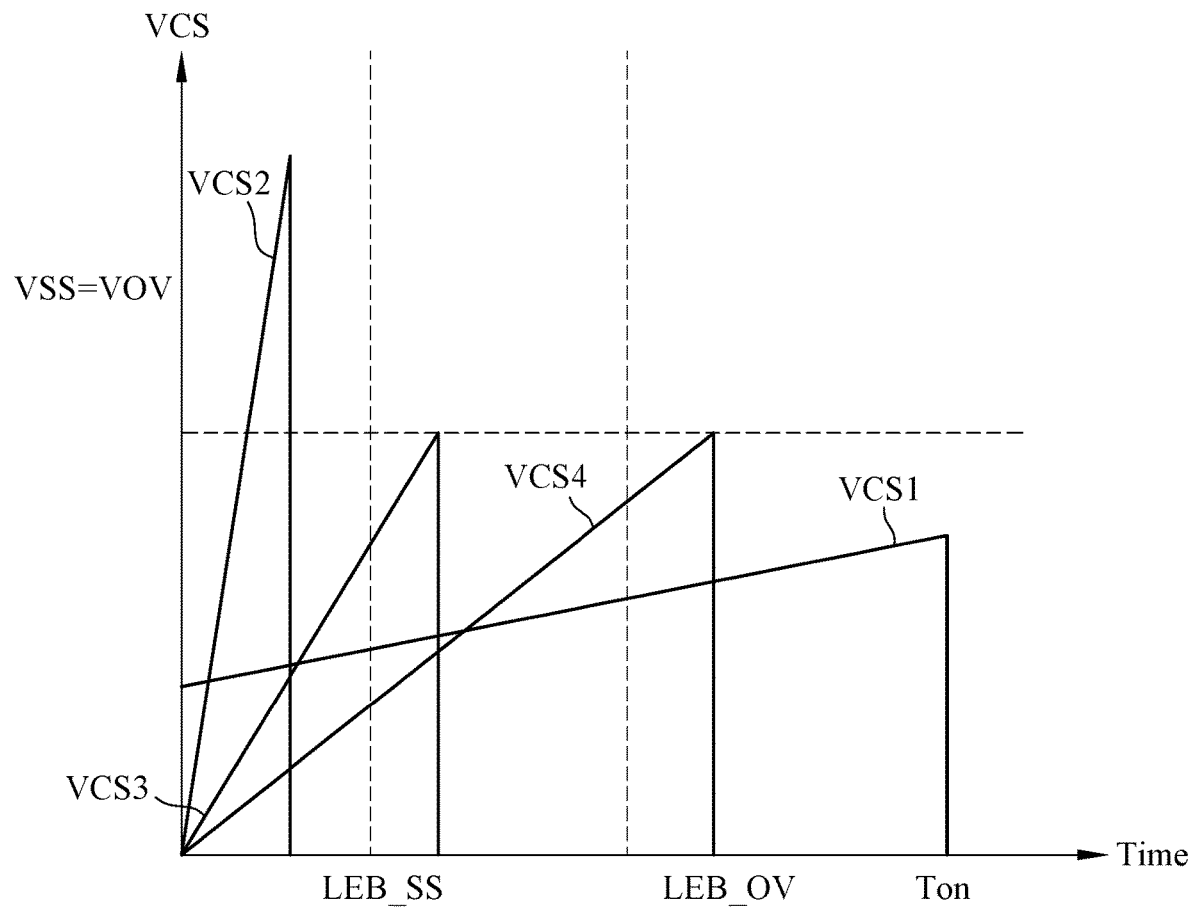
FIG. 4 is a view showing another illustrative waveform of the power converter controller according to the first embodiment of the present invention.

Further refer to FIGS. 3 and 4 showing two illustrative waveforms of the power control operation. Specifically, the over-current protection threshold voltage VOV is greater than the short-circuit protection threshold voltage VSS in FIG. 3, and the over-current protection threshold voltage VOV is equal to the short-circuit protection threshold voltage VSS in FIG. 4.

As shown in FIG. 3, the PWM turn-on time Ton represents the period of time when the switch unit 40 is turned on by the PWM driving signal VGS, and the PWM turn-on time Ton is greater than the short-circuit protection leading edge blanking time LEB_SS and the over-current protection leading edge blanking time LEB_OV.

Since the current sensing voltage VCS1 reaches the full loading at the PWM turn-on time Ton but is not greater than the short-circuit protection threshold voltage VSS, the step S12 does not enter the step S13, and the step S14 after the step S12 does not enter the step S15 and S16, thereby continuing generating the PWM driving signal VGS. In other words, the current sensing voltage VCS1 indicates that the system normally operates and does not suffers from the abnormality like short-circuit or over-current.

Further, the current sensing voltage VCS2 increases to exceed the short-circuit protection threshold voltage VSS within the short-circuit protection leading edge blanking time LEB_SS, but decreases down to less than the short-circuit protection threshold voltage VSS (like 0V as shown) before or at the short-circuit protection leading edge blanking time LEB_SS. That is, the current sensing voltage VCS2 larger than the short-circuit protection threshold voltage VSS does not last over the short-circuit protection leading edge blanking time LEB_SS. Accordingly, the step S12 does not enter the step S13, and the step S14 after the step S13 does not enter the step S15 and S16. In other words, the current sensing voltage VCS2 increases to exceed the short-circuit protection threshold voltage VSS is just noise, and does not indicate any abnormality happens. Overall, the operation of the system is normal.

Now examine the current sensing voltage VCS3. After the short-circuit protection leading edge blanking time LEB_SS, the current sensing voltage VCS3 increases to attain to or exceed the short-circuit protection threshold voltage VSS but less than the over-current protection threshold voltage VOV, the step S12 enters the step S13 and the current sensing voltage VCS3 thus indicates the short-circuit abnormality happens, thereby immediately turning off the switch unit 40 and stopping the PWM driving signal to implement short-circuit protection. That is, the output power VOUT does not supply the load RL.

After the over-current protection leading edge blanking time LEB_OV, the current sensing voltage VCS4 increases to exceed the over-current protection threshold voltage VOV, the step S12 enters the step S14, and the steps S15 and S16 are sequentially performed after the step S14. In other words, the current sensing voltage VCS4 indicates that the over-current or over-loading abnormality happens, thereby turning off the switch unit 40 and stopping the PWM driving signal after the delay time to implement over-current protection. Accordingly, the output power VOUT does not supply the load RL.

In short, the short-circuit protection leading edge blanking time LEB_SS is preset to be not larger than the over-current protection leading edge blanking time LEB_OV for determining whether the short-circuit abnormality occurs, thereby preventing the system from interference due to any instantaneous peak noise.

Accordingly, for the over-current protection threshold voltage VOV equal to the short-circuit protection threshold voltage VSS in FIG. 4, the PWM driving signal VGS is continuously generated and the steps S13 and S16 are not performed for the current sensing voltage VCS1 and CS2 because of no normality, but the steps S13 and S16 are performed for the current sensing voltage VCS3 and CS4 to implement appropriate protection because of short-circuit and over-current abnormalities, respectively.

Moreover, the power control operation performed by the power converter controller 10 of the first embodiment comprises an additional protection when the current sensing resistor is short-circuited. In the step S14, if the current sensing voltage VCS is larger than the over-current protection threshold voltage VOV and the determination time is equal to or greater than the over-current protection leading edge blanking time LEB_OV, the current sensing voltage VCS is further compared with a preset current sensing short-circuit voltage like one percent or even one thousandth of the input power VDD, instead of performing the step S15. If the current sensing voltage VCS is not less than the current sensing short-circuit voltage, the step S11 is performed to continuously generate the PWM driving signal VGS. However, if the current sensing voltage VCS is less than the current sensing short-circuit voltage, it means that the current sensing resistor 60 is short-circuited, and the PWM driving signal VGS immediately stops for protection. Specifically, when the current sensing resistor 60 is short-circuited, the current sensing voltage is too low and causes a considerable current to seriously damage the switch unit 40.

Figure 5:
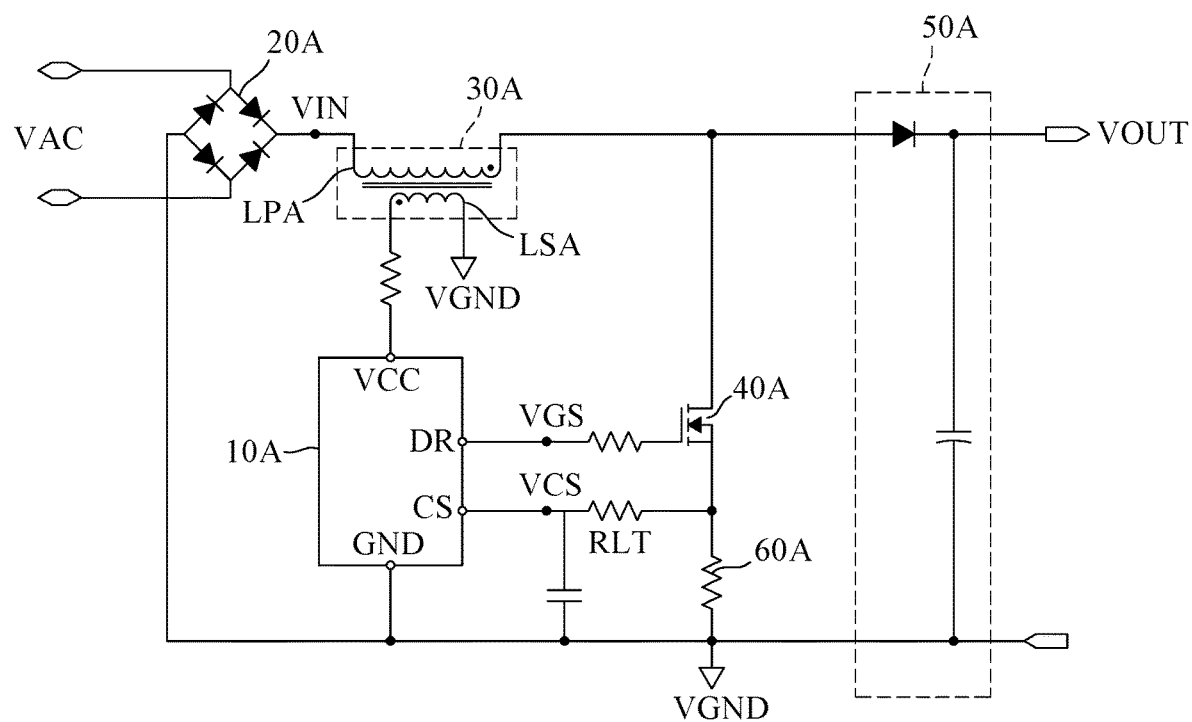
FIG. 5 is a view showing the power converter controller according to the second embodiment of the present invention.

Further refer to FIG. 5 showing the power converter controller according to the second embodiment of the present invention. The power converter controller 10A of the second embodiment is similar to the power converter controller 10 of the first embodiment, and has an short-circuit protection leading edge blanking time LEB_SS, an over-current protection leading edge blanking time LEB_OV, an over-current protection threshold voltage VOV, and a short-circuit protection threshold voltage VSS preset, and comprises an input power pin VCC, a ground pin GND, a PWM driving pin DR, and a current sensing pin CS, but is not provided with the feedback pin FB.

Additionally, the power converter controller 10A of the second embodiment is in collocation with a rectification unit 20A, a transformer 30A, a switch unit 40A, and a power output unit 50A to perform a power control operation for converting an external input power VAC into an output power VOUT. The current sensing pin CS is connected to a source of the switch unit 40A through a current limiting resistor RLT, and the source of the switch unit 40A is further connected to a ground level VGND through a current sensing resistor 60A, thereby the source of the switch unit 40A generating a current sensing voltage VCS.

Further, the transformer 30A comprises a primary winding LPA and a secondary winding LSA, the primary winding LPA connects the rectification unit 20A to a drain of the switch unit 40A, and the drain is further connected to the power output unit 50A. The secondary winding LSA connects the input power pin VCC to the ground level VGND. The rectification unit 20A receives and converts the external input power VAC into the rectification power VIN.

Figure 6:
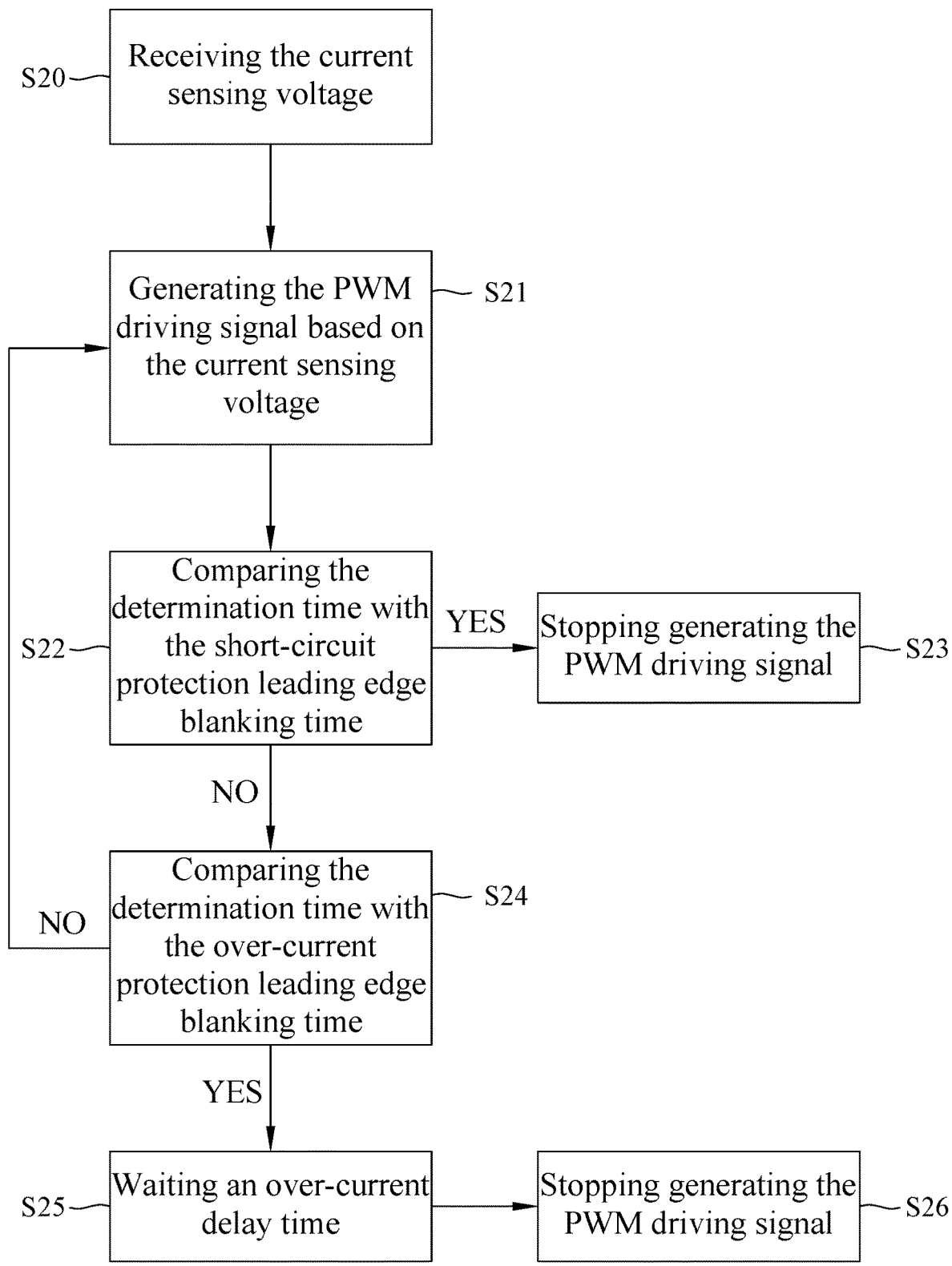
FIG. 6 is a flowchart of the power control operation performed by the power converter controller according to the second embodiment of the present invention.

The power control operation performed by the power converter controller 10A of the second embodiment as shown in FIG. 6 comprises the steps S20, S21, S22, S23, S24, S25, and S26, which are similar to the steps S10, S11, S12, S13, S14, S15, and S16 of the first embodiment. It should be noted that one difference is that the second embodiment is not in collocation with the feedback unit, and does not use the feedback signal. That is, only the current sensing voltage VCS is received in the step S20, and only the current sensing voltage VCS is utilized in the step S21 to generate the PWM driving signal VGS. Thus, the steps S22, S23, S24, S25, and S26 are the same as the steps S12, S13, S14, S15, and S16, and will be not described in detail hereinafter.

Moreover, the power control operation performed by the power converter controller 10A of the second embodiment also comprises an additional protection, which is intended to immediately stop the PWM driving signal VGS to turn off and protect the switch unit 40 from damage due to a considerable current when the current sensing resistor 60A is short-circuited.

The power converter controller of the second embodiment has the operational waveforms similar to the first embodiment as shown in FIGS. 3 and 4 to implement appropriate protection functions for the abnormality of short-circuit and over-current, and further avoid malfunction due to any instantaneous peak noise.

Overall, the short-circuit protection leading edge blanking time LEB_SS, the over-current protection leading edge blanking time LEB_OV, the over-current protection threshold voltage VOV, and the short-circuit protection threshold voltage VSS are crucial parameters and can be updated for optimal performance. Thus, the present invention easily meets various applications.

From the above mention, the aspect of present invention is that the short-circuit protection threshold voltage not higher than the over-current protection threshold voltage is used and in collocation with the current sensing pin to instantly detect if the semiconductor elements suffer from abnormal voltage or over-current, and appropriate protection operations are further performed to effectively prevent the semiconductor elements from damage. Further, the short-circuit protection leading edge blanking time and the over-current protection leading edge blanking time can be dynamically adjusted to provide optimal protection, avoid malfunction, prevent the system from damage, and assure safety for the whole operation.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:
1. A power converter controller having a short-circuit protection leading edge blanking (LEB) time, an over-current protection leading edge blanking time, a short-circuit protection threshold voltage, and an over-current protection threshold voltage in collocation with a rectification unit, a transformer, a switch unit, and a power output unit to perform a power control operation for converting an external input power into an output power to supply a load, the power converter controller comprising:
   an input power pin connected to an input power;
   a ground pin connected to a ground level;
   a pulse width modulation (PWM) driving pin connected to a gate of the switch unit;
   a current sensing pin connected to a source of the switch unit, the source further connected to the ground level through a current sensing resistor, the current sensing resistor generating a current sensing voltage; and
   a feedback pin connected to a feedback unit, the feedback unit further connected to the power output unit for generating a feedback voltage corresponding to the output power;
   wherein the short-circuit protection threshold voltage is no higher than the over-current protection threshold voltage, the short-circuit protection leading edge blanking time is less than the over-current protection leading edge blanking time, the rectification unit receives and converts the external input power into a rectification power, the transformer comprises a primary winding and a secondary winding, the primary winding connects the rectification unit to a drain of the switch unit and receives the rectification power, the secondary winding is connected to the power output unit, the power output unit is connected to the load, and the power control operation comprises:
   the power converter controller receiving the feedback voltage and the current sensing voltage;
   generating a PWM driving signal based on the feedback voltage and the current sensing voltage, the PWM driving signal having a turn-on level and a turn-off level interleaving and repeating periodically;
   performing a timer operation to generate a determination time, the PWM driving signal being the turn-on level and the switch unit being turned on during the determination time, the determination time intended for determining whether the current sensing voltage is greater than the short-circuit protection threshold voltage;
   comparing the determination time with the short-circuit protection leading edge blanking time and the over-current protection leading edge blanking time if the current sensing voltage is equal to or greater than the short-circuit protection threshold voltage and is not greater than the over-current protection threshold voltage;
   stopping generating the PWM driving signal if the determination time is not less than the short-circuit protec- tion leading edge blanking time and not greater than the over-current protection leading edge blanking time; and stopping generating the PWM driving signal if the determination time is equal to or greater than the over-current protection leading edge blanking time and an over-current delay time preset passes.

2. The power converter controller as claimed in claim 1, wherein the turn-on level is a high level and the turn-off level is a low level lower than the high level.

3. The power converter controller as claimed in claim 1, wherein the turn-on level is a low level and the turn-off level is a high level higher than the high level.

4. The power converter controller as claimed in claim 1, wherein the switch unit is implemented by a Metal-Oxide-Semiconductor (MOS) transistor, a Gallium Nitride field effect transistor (GaN FET), or a silicon carbide (SiC)-MOSFET.

5. The power converter controller as claimed in claim 1, wherein the feedback unit comprises a photo coupler.

6. A power converter controller having a short-circuit protection leading edge blanking time, an over-current protection leading edge blanking time, a short-circuit protection threshold voltage, and an over-current protection threshold voltage in collocation with a rectification unit, a transformer, a switch unit, and a power output unit to perform a power control operation for converting an external input power into an output power to supply a load, the power converter controller comprising:

an input power pin connected to an input power;

a ground pin connected to a ground level;

a pulse width modulation (PWM) driving pin connected to a gate of the switch unit; and a current sensing pin connected to a source of the switch unit, the source further connected to the ground level through a current sensing resistor, the current sensing resistor generating a current sensing voltage;

wherein the short-circuit protection threshold voltage is no higher than the over-current protection threshold voltage, the short-circuit protection leading edge blanking time is less than the over-current protection leading edge blanking time, the rectification unit receives and converts the external input power into a rectification power, the transformer comprises a primary winding and a secondary winding, the primary winding connects the rectification unit to a drain of the switch unit and receives the rectification power, the secondary winding is connected to the power output unit, the power output unit is connected to the load, and the power control operation comprises:

the power converter controller receiving the current sensing voltage;

generating a PWM driving signal based on the current sensing voltage, the PWM driving signal having a turn-on level and a turn-off level interleaving and repeating periodically;

performing a timer operation to generate a determination time, the PWM driving signal being the turn-on level and the switch unit being turned on during the determination time, the determination time intended for determining whether the current sensing voltage is greater than the short-circuit protection threshold voltage;

comparing the determination time with the short-circuit protection leading edge blanking time and the over-current protection leading edge blanking time if the current sensing voltage is equal to or greater than the short-circuit protection threshold voltage and is not greater than the over-current protection threshold voltage;

stopping generating the PWM driving signal if the determination time is not less than the short-circuit protection leading edge blanking time and not greater than the over-current protection leading edge blanking time; and stopping generating the PWM driving signal if the determination time is equal to or greater than the over-current protection leading edge blanking time and an over-current delay time preset passes.

7. The power converter controller as claimed in claim 6, wherein the turn-on level is a high level and the turn-off level is a low level lower than the high level.

8. The power converter controller as claimed in claim 6, wherein the turn-on level is a low level and the turn-off level is a high level higher than the high level.

9. The power converter controller as claimed in claim 6, wherein the switch unit is implemented by a Metal-Oxide-Semiconductor (MOS) transistor, a Gallium Nitride field effect transistor (GaN FET), or a silicon carbide (SiC)-MOSFET.

* * * * *